Figure 1:
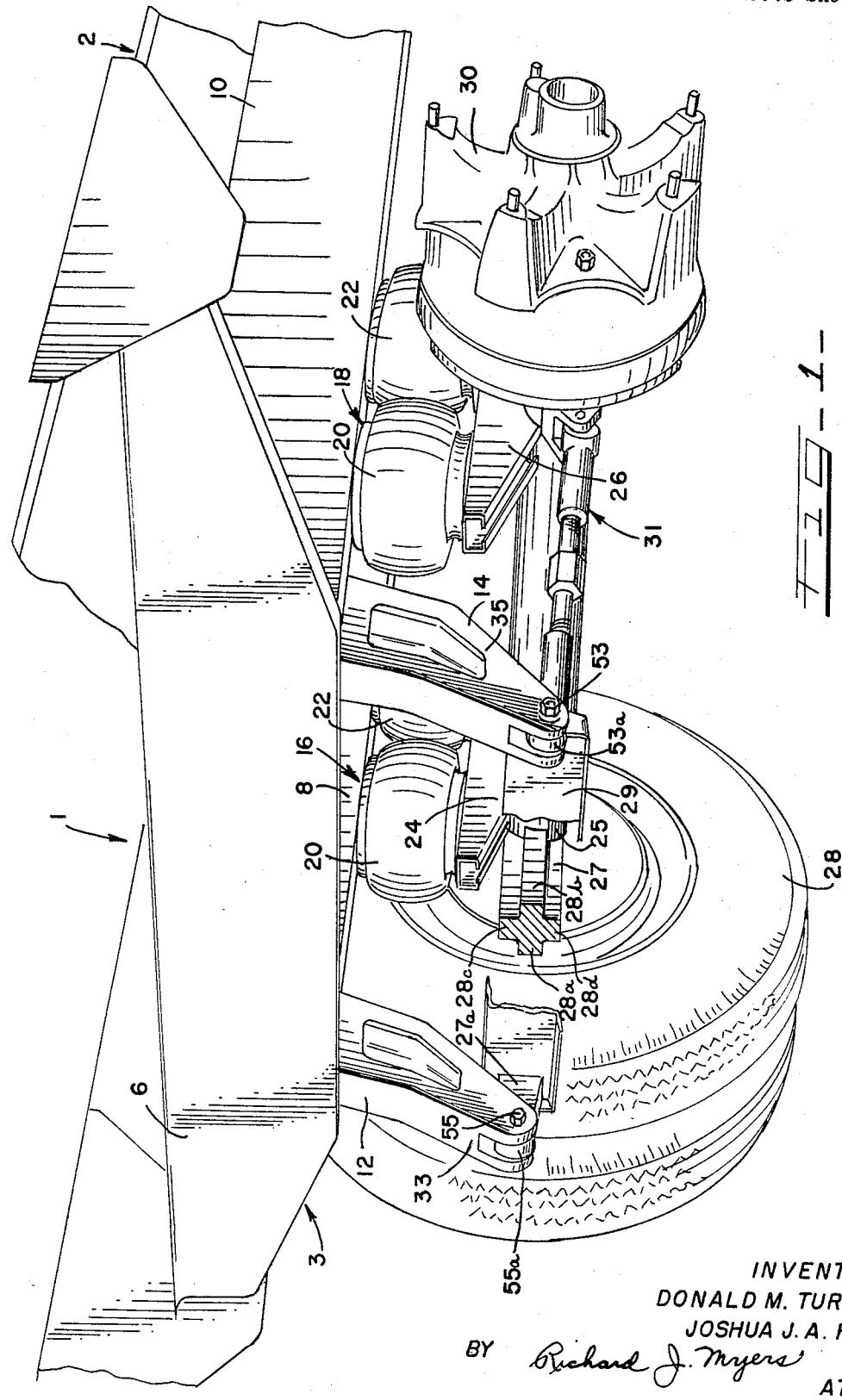

INVENTORS
DONALD M. TURNBULL
JOSHUA J. A. HALL
BY Richard J. Myers
ATT'Y.

Nov. 12, 1968  D. M. TURNBULL ET AL  3,410,575
STABILIZING STRUCTURE FOR A VEHICLE SUSPENSION SYSTEM
Filed July 18, 1966  2 Sheets-Sheet 2

INVENTORS
DONALD M. TURNBULL
JOSHUA J. A. HALL
BY Richard J. Myers
ATT'Y.

United States Patent Office 3,410,575
Patented Nov. 12, 1968

3,410,575
STABILIZING STRUCTURE FOR A VEHICLE
SUSPENSION SYSTEM
Donald M. Turnbull, Cincinnati, and Joshua J. A. Hall, Vandalia, Ohio, assignors to Pullman, Incorporated, Chicago, Ill., a corporation of Delaware
Filed July 18, 1966, Ser. No. 566,010
12 Claims. (Cl. 280—124)

This invention relates to new and useful improvements in vehicle suspensions and in particular provides a stabilizing structure for the vehicle suspension.

With conventional leaf spring suspensions which are common on vehicles such as trailers, the leaf springs are capable of preventing the vehicle axle from moving crosswise of the trailer under jack-knife and curve conditions and also of preventing rotation of the axle under braking. However, when deformable cushion type springs such as air bags, or coil springs are used in place of the leaf springs for softer rides, other means must be provided to prevent the above mentioned motions of the axle, since these latter types of springs are capable of exerting a force in one direction only.

In the deformable cushion type vehicle suspension arrangement, a track bar is utilized to prevent the axle from moving transversely of the trailer and a torque rod prevents rotation of the axle upon braking of the vehicle. Also the vehicle tends to lean towards the outside of the curve when the vehicle is making a turn and therefore to reduce this tendency a sway bar is used, and, of course, radius rod means are employed to perform the function of preventing horizontal translation (fore and aft movement) of the axle under braking.

One purpose of the subject invention is to perform all the functions normally associated with the conventional radius rods, the torque tower and torque rod, the track bar and the sway bar, but to do them with fewer components.

A further object of this invention is to provide a stabilizing component comprising a beam means which is strong and relatively rigid in both the horizontal and vertical directions, yet is torsionally flexible, such as may be provided by a cruciform across section or a cross section that is in the form of a Greek cross with right angled arms such as in the form of a swastika.

It is another object of this invention to provide for a stabilizing beam structure comprising a combination torque and radius rod means in coupled relation with a sway force transmitting lever translating same into a torsional force on the stabilizing beam structure.

A further object of this invention is to provide a vehicle suspension stabilizing beam structure which would perform a radius-rod function in which it is stressed axially, a torque rod function, in which it is bent in a vertical plane, a track bar function in which it is bent as a cantilever in the horizontal plane, and a sway bar function in which it is twisted torsionally about its own axis.

Another object of ths invention is to provide for the combination of a lever arm and radius rod, in which sway forces acting on the lever arm are translated into torsion in the radius rod which, in turn, acts on the axle to which it is connected, in such a way as to restrict the vertical angle between the axle and the vehicle frame. At the same time the radius rod, being rigidly attached to the axle, is able to restrict its tendency to rotate when the brakes are applied.

It is still another object of this invention to provide for a novel vehicle suspension beam structure means of simplified construction utilizing fewer components and pinned joints.

Figure 2:
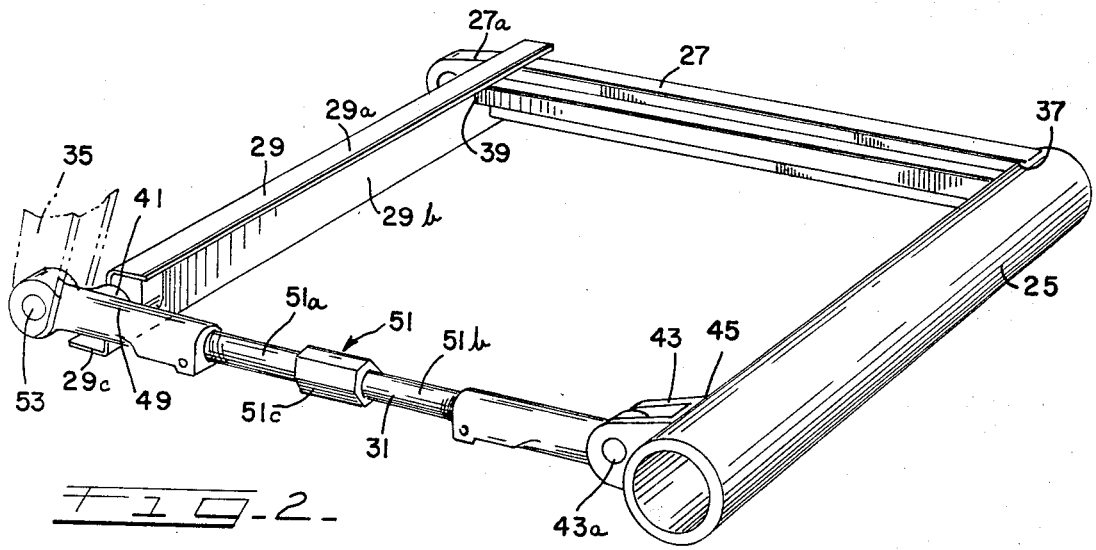

These and other objects will become apparent from reference to the following specifications, appended claims and accompanying drawings wherein:
FIG. 1 is an illustrative perspective partial view of the novel vehicle suspension system of our invention employing the novel stabilizing beam structure means;
FIG. 2 is a perspective view of the novel beam structure of the invention apart from the trailer.

With reference now to the drawings and in particular with reference to FIG. 1 there is shown, in part, a vehicle such as a trailer 1 (partly shown) including a cargo body 2 and a trailer underframe structure 3 having a transverse frame or bolster 6 connecting with a pair of longitudinally extending side frames 8 and 10 from which depends a pair of front brackets 12 and 14 having a pair of rearwardly placed laterally spaced deformable resilient cushion sets 16 and 18, each set comprising a pair of longitudinally disposed cushioning elements or spring elements such as air spring units 20 and 22, each element 20 or 22 being attached to the underframe structures 8 or 10 and each unit comprising the conventional type of air bag supplied with a source of pneumatic pressure such as air from a pressurized source. The lower portion of each bag 20 or 22 is attached to and supports an air bag pad 24 or 26, the forward bag 20 being supported at the forward end of the pad or support 24 or 26 and the rear bag 22 being on the rearward end of the pad 24 or 26. A wheel carrying axle structure 25 is rigidly attached on the underside of each pad 24, 26, as by welding, the axle being disposed centrally of the pad and intermediate each of the air bags 20 and 22, the outer ends of the axle 25 outwardly of the pads each carrying a tired wheel as for instance, shown by wheel 28 or partial wheel structure 30 as shown in FIG. 1 of the drawings.

A stabilizing structure for the vehicle suspension system, including the air cushioning units 20 and 22, the vehicle underframe 6, 8, and 10 and the axle structure 25 comprises a fixed torsion radius rod structure 27 (shown partially cut away), a roll arresting unit 29 and an adjustable radius rod 31, all attached to the axle structure 25 and to the trailer underframe 3 by trailer underframe hanger elements or front brackets 33 and 35.

The combined fixed radius rod and torque rod element 27 is fixedly attached to the axle as by welding at 37 (see FIG. 2) to the axle structure 25 and extends forwardly and perpendicularly thereof and is rigidly attached to the roll arresting member 29 as by welding at 39. Whereas the other end of the roll arresting member 29 has a pin connection 41 with one end of the adjustable radius rod 31 and the other end of the adjustable radius rod 31 is pivotally connected to the axle bracket 43 by pivot connection 43a and which in turn is fixedly attached to the axle as by welding and indicated by number 45 (see FIG. 2). The pinned connection 41 between the roll arresting member 29 and the adjustable radius rod member 31 may consist of a ball socket arrangement as shown in FIG. 2 as shown by numeral 49, or may be a rubber bushed pin, such arrangements allowing the roll arresting member to act as a lever to apply a twisting or torque action to the member 27, without twisting the adjustable radius rod 31. The adjustable radius rod 31 may have its length adjusted by the turnbuckle construction 51, the turnbuckle arms 51a and 51b being threadable in and out of the end castings. The hanger 35 is pivotally attached to the adjustable radius rod 31 by pivot connection 53 with rubber bushing 53a and the fixed radius rod and torque rod member 27 is pivotally attached to the hanger element 33 by its extension 27a forwardly of the connection of the roll arresting member 29a to the member 27, by means of the pivot connection 55 with rubber bushing 55a (see FIG. 1). The fixed torque and radius rod structure 27 is cruciform in cross section having horizontal flanges 28a and 28b and vertical flanges 28c and 28d. It will be appreciated that this radius and torque rod member 27 may take other forms such as a Greek cross with right angle bends such as the swastika, so long as there are present vertical and horizontal force resisting or stress portions such as parts 28a, 28b, 28c and 28d. The roll arresting member may have a Z-shaped cross section with flanges 29a, 29b and 29c. The roll arresting member 29 extends parallel to the axle 25 and acts as a lever arm to twist the radius rod 27.

The special radius rod torque arm member 27 functions in tension as a radius rod to carry the axle 25 with the trailer body upon braking and its fixed connection with the axle permits it to act as a torque rod to prevent rotation of the axle upon braking and therefore acts as a cantilevered beam with bending taking place in the vertical plane. Under sway conditions, the special radius rod 27 acts as a torsion spring as the transverse bar or roll arresting member 29 tends to wind up the special radius rod 27 when one hanger 33 or 35 moves vertically with respect to the other hanger while the axle 25 remains parallel to the road, the winding-up of the special radius-torque rod resisting the vertical movement and consequently minimizing the sway. The connection 41 insures that the lever arm 29 acts as a simple beam at all times. The degree of sway control depends on the torsional rigidity of the special radius rod. Under the same conditions which cause side sway, there exists a force on the trailer acting crosswise, which is resisted entirely by the special torque-radius rod member 27 acting as a cantilevered beam, with bending taking place in the horizontal plane. The special radius rod acts as a track bar under these conditions.

In operation, the suspension performs the requisite functions of a trailer suspension. Upon braking and acceleration, the fixed radius-torque rod carries the axle with the trailer and prevents excessive axle rotation. Under sway conditions where one hanger moves vertically with respect to the other and the axle remains parallel to the ground the fixed radius-torque rod is torsionally stressed by angular movement, the roll arresting member acting as a lever on it. It thus tends to counteract the vertical movement. The fixed radius-torque rod also acts as a cantilevered beam in preventing the trailer from moving parallel to the axle. Therefore, there is provided by this invention a single torque arm unit rigidly attached to the axle and pivotally secured to a bracket combined with a roll arresting member which transmits the force of sway movement to the torque arm.

Figure 3:
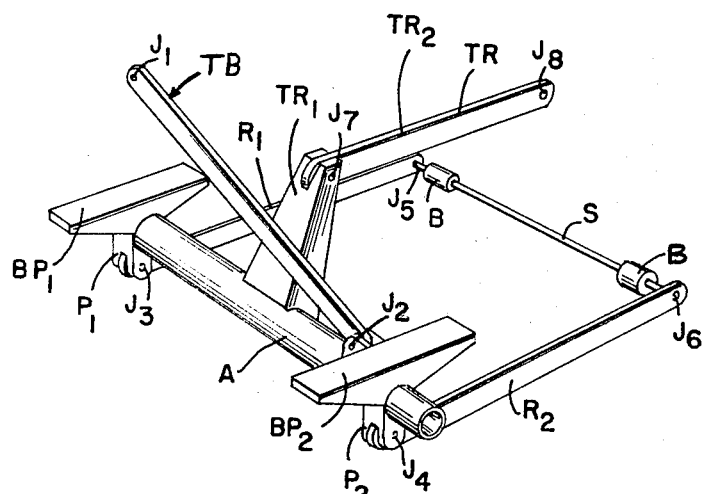

For a comparison with the conventional suspension system see FIG. 3 which shows an axle A carrying a pair of air bag pads $BP_1$, $BP_2$ fixedly secured thereto and a pair of pivot means $P_1$ and $P_2$ suspended from each respective pad P pivotally connecting respectively with radius rods $R_1$ and $R_2$ which in turn are interconnected by a sway bar S with bearings B and a torque tower $TR_1$ is fixedly attached to the axle and has a torque rod $TR_2$, all forming the torque rod means TR which is pivotally connected to the trailer underframe, and a track bar TB is pivotally attached to the axle near pad $BP_2$. The conventional suspension of FIG. 3 utilizes eight components $TR_1$, $TR_2$, S, $R_1$, $R_2$, TB, $BP_1$, and $BP_2$ and eight joints shown as $J_1$ through $J_8$ whereas the improved suspension of the subject invention utilizes five components, namely two air pads 24, 26, the torque and radius rod 27, the roll arresting member 29, and the radius rod 31 and three pinned joints 53, 55 and 43a and the connection 41, which may be a rubber bushed pin joint, the invention resulting in a novel and useful simplified structure and providing a significant saving in cost and in weight.

The foregoing description and drawings are given merely to explain and illustrate the invention and the invention is not to be limited thereto, except insofar as the inventive claims are so limited, since those skilled in the art who may have the disclosure before them will be able to make modifications and variations therein without departing from the scope of the invention.

What is claimed is:

1. A combination torque arm and radius rod mechanism for a resilient cushion vehicle suspension system for a vehicle body and axle means comprising a stabilizing beam structure having a first end portion for fixed connection with the axle means and a second end portion, a roll arresting lever means having a first end fixedly connected with the second end portion of said beam structure and having another end, a radius rod having one end connected with said other end of the roll arresting lever means for axle alignment and having another end portion for pivotal connection with the vehicle axle means, the beam structure and the radius rod being adapted for pivotal connection with the vehicle body, the beam structure, the roll arresting member, and radius rod, and the axle means defining generally a rectilinear structure resiliently suspended from said trailer body to function as a radius and torque rod and track and sway bar mechanism.

2. The invention according to claim 1 and said radius rod being adjustable for axle alignment.

3. A radius rod means for a deformable cushioned vehicle suspension comprising a beam structure adapted for torque and draft coupling with the vehicle axle and adapted to extend in a longitudinal direction of the vehicle, a radius rod adapted for connection with the axle and in general parallel alignment with the beam structure, a roll arresting member connected with the end of the beam structure outwardly of the axle for applying a moment to the beam structure and having its other end connected with said radius rod for transmitting torque to said beam structure in arresting roll of the vehicle, the outer free end of the beam structure beyond its connection with the roll arresting member being adapted for pivotal connection with the vehicle frame and the outer free end of the radius rod extending beyond its connection with the roll arresting member being adapted for pivotal connection with the vehicle frame.

4. A radius rod means for a deformable cushioned vehicle suspension for the vehicle frame underframe and axle, comprising a beam structure adapted for torque and draft coupling with the vehicle axle and the frame and adapted to extend in a longitudinal direction of the vehicle, a radius rod adapted for connection with the axle and the frame and in general parallel alignment with the beam structure, a roll arresting member rigidly connected with that end of the beam structure opposite the end to which the axle is connected and having its other end connected with said radius rod for applying a moment to said beam structure in arresting roll of the vehicle.

5. The invention according to claim 4 and said beam structure being of such a cross section as to provide substantial resistance to bending in the horizontal and vertical planes, yet at the same time allowing it to be torsionally flexible.

6. The invention according to claim 4 and said beam structure having cruciform cross-sectional shape.

7. A deformable cushioned suspension system for a vehicle comprising a vehicle axle, a vehicle underframe, deformable cushioned suspension means disposed between the frame and the axle at laterally spaced positions thereof upon perch means fixedly connected with the axle, a pair of laterally spaced radius rod means coupled to the axle and roll arresting means interconnecting each radius rod means and spaced from the axle, each of said radius rod means having extension beyond the roll arresting means for pivotal connection with the trailer frame, one of said radius rod means being rigidly attached with the axle and to the roll arresting member and the other radius rod means having a connection with the roll arresting member and having a pivotal connection with the axle in defining a generally rectilinear vehicle frame to axle stabilizing coupling.

8. A deformable cushioned suspension system for a vehicle comprising a vehicle axle, a vehicle underframe, cushioned suspension means disposed between the frame and the axle at laterally spaced positions thereof upon perch means connected with the axle, a pair of laterally spaced radius rod means coupled to the axle and roll arresting means interconnecting each radius rod means, one of said radius rod means being rigidly attached with the axle and rigidly attached with the roll arresting member and the other radius rod means having a connection with the roll arresting member and with the axle in defining a vehicle frame-to-axle stabilizing coupling.

9. A vehicle comprising a vehicle frame and an axle supporting said frame and a vehicle suspension system disposed between the vehicle body frame and the axle comprising cushion means attached to the frame, perch means attached to the cushion means and mounted on the vehicle axle, hanger means depending from the frame, a structure coupled between said axle and said hanger means and comprising a torque-and-radius rod having one end connected to the axle and having the other end connected to the hanger means, a radius rod attached to the axle and to the hanger means and spaced laterally of said torque-and-radius rod, and a roll arresting member intercoupling said torque-and-radius rod with said radius rod and having a fixed connection with torque-and-radius rod.

10. A vehicle comprising a vehicle body having a frame and axle supporting said body and a vehicle suspension system disposed between the vehicle body frame and the axle comprising cushion means attached to the frame, perch means attached to the cushion means and mounted on the vehicle axle, hanger means depending from the frame, a structure coupled between said axle and said hanger means and comprising a fixed torque-and-radius rod having one end rigidly connected to the axle and having the other end pivotally connected to the hanger means, a radius rod attached to the axle and to the hanger means and spaced laterally of said torque-and-radius rod and a roll arresting member intercoupling said torque-and-radius rod with said radius rod intermediate the hanger means and the axle and having a fixed connection with the said torque-and-radius rod.

11. A vehicle comprising a vehicle body having a frame and axle supporting said body and a vehicle suspension system disposed between the vehicle body frame and the axle comprising cushion means attached to the underframe and mounted on the vehicle axle, a structure coupled between said axle and said frame and comprising a fixed torque-and-radius rod having one end fixedly connected to the axle and having the other end connected with the frame, means attached to the axle and to the frame and spaced laterally of said torque-and-radius rod, and a roll arresting member interconnecting with said last mentioned means and said torque-and-radius rod and having a fixed connection with said torque-and-radius rod for applying a torque to said torque-and-radius rod.

12. A stabilizing force receiving structure for a deformable cushioned vehicle suspension system comprising a combination torque-and-radius rod adapted for a fixed connection with a vehicle axle at one end thereof and adapted for a pivotal connection at the other end with the vehicle frame, a radius rod for attachment to the axle and to the frame, and a roll arresting member having one end in rigid connection with said torque-and-radius rod intermediate the ends thereof and having the other end connecting with said radius rod for preventing rotation of the axle, counteracting swaying of the vehicle and preventing horizontal translation of the axle under braking in longitudinal and transverse directions.

References Cited

UNITED STATES PATENTS

| 2,901,340 | 8/1959 | Fikse | 267—11 |
| 3,007,716 | 11/1961 | Maharick | 267—67 |
| 3,215,384 | 11/1965 | Chambers | 280—104.5 |
| 3,333,866 | 8/1967 | Cuskie | 280—124 |

BENJAMIN HERSH, *Primary Examiner.*

L. D. MORRIS, JR., *Assistant Examiner.*